(12) United States Patent
Nakano et al.

(10) Patent No.: US 6,462,452 B2
(45) Date of Patent: Oct. 8, 2002

(54) PERMANENT MAGNET MOTOR (75) Inventors: Masatsugu Nakano; Tsutomu Tominaga; Hideki Megata, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/826,105

(22) Filed: Apr. 5, 2001

(65) Prior Publication Data

US 2002/0003382 A1 Jan. 10, 2002

(30) Foreign Application Priority Data

May 25, 2000 (JP) ........................................ 2000-153909

(51) Int. Cl.$^7$ .............................................. H02K 21/00
(52) U.S. Cl. .............................. 310/156.47; 310/156.43
(58) Field of Search ........................ 310/156.47, 156.43, 310/49 R (56) References Cited

U.S. PATENT DOCUMENTS

| | | | |
|---|---|---|---|
| 4,025,810 A | * 5/1977 | Field ........................... | 310/156 |
| 4,029,977 A | * 6/1977 | Chai et al. ................. | 310/49 R |
| 4,081,703 A | * 3/1978 | Madsen et al. ............ | 310/49 R |
| 4,672,258 A | * 6/1987 | Tajima et al. .............. | 310/269 |
| 4,868,438 A | * 9/1989 | Okamoto et al. ........... | 310/166 |
| 4,933,584 A | * 6/1990 | Harms et al. ............... | 310/162 |
| 5,708,310 A | * 1/1998 | Sakamoto et al. ........ | 310/49 R |
| 6,049,153 A | * 4/2000 | Nishiyama et al. ......... | 310/156 |
| 6,104,117 A | 8/2000 | Nakamura et al. .......... | 310/254 |

FOREIGN PATENT DOCUMENTS

| | | | |
|---|---|---|---|
| JP | 55-71162 | 5/1980 | |
| JP | 62-244259 | * 10/1987 | .......... H02K/21/08 |
| JP | 62-268347 | 11/1987 | |
| JP | 51-68181 | 7/1993 | |
| JP | 51-68182 | 7/1993 | |
| JP | 2-564801 | 10/1996 | |
| JP | 2-588661 | 12/1996 | |
| JP | 2-636108 | 4/1997 | |
| JP | 10-42531 | 2/1998 | |
| JP | 11-18326 | 1/1999 | |
| JP | 11-69679 | 2/1999 | |

* cited by examiner

Primary Examiner—Burton S. Mullins
(74) Attorney, Agent, or Firm—Leydig, Voit & Mayer, Ltd.

(57) ABSTRACT

A permanent magnet motor having a rotor with permanent magnets disposed on the outer circumferential face at a predetermined interval in a peripheral direction, and a stator with magnetic pole pieces arranged at a predetermined spacing in the peripheral direction, the magnetic pole pieces being opposed to the permanent magnets, the stator surrounding the rotor, wherein auxiliary grooves are provided on a face of each magnetic pole piece of the stator opposed to the permanent magnets of the rotor, and a skew having an electric angle of 72° is provided relatively between the rotor and the stator.

6 Claims, 12 Drawing Sheets

→ ELECTRIC ANGLE OF 72 DEGREES

ELECTRIC ANGLE OF 72 DEGREES

PERMANENT MAGNET MOTOR

BACKGROUND OF THE INVENTION

1. Field of the Invention

The present invention relates to a permanent magnet motor, and more particularly to a structure of the permanent magnet motor with higher performance in which the cogging torque is reduced and the torque ripple is also reduced.

2. Description of the Related Art

In recent years, there is a demand for electric motors having small cogging torque and torque ripple for various purposes. Conventionally, one method of reducing the cogging torque of a permanent magnet motor has been proposed in which auxiliary grooves are formed on a face of each magnetic pole piece of the stator opposed to the permanent magnets of the rotor, though not shown, as disclosed in JP-A-10-42531, or a skew is provided by the amount of a period of cogging torque, as disclosed in JP-A-8-223832, for example.

In the conventional permanent magnet motor, as described above, the auxiliary grooves are formed on a face of each magnetic pole piece of the stator opposed to the permanent magnets of the rotor, and a skew is provided by the amount of a period of cogging torque, to reduce the cogging torque. However, when a skew angle provided at this time is inappropriate to reduce the torque ripple, the cogging torque and the torque ripple can not be reduced concurrently. For example, in a six-pole, nine-slot electric motor, if two auxiliary grooves are formed on a face of each magnetic pole piece of the stator, there is the almost equivalent effect where the number of slots in the stator is virtually 27. Then, the number of cogging torque ripples per rotation of the rotor is equal to 54, which is a least common multiple of the number of poles 6 and the virtual number of slots 27. And the period of cogging torque is converted to 20 degrees in terms of the electrical angle, and the cogging torque can be significantly reduced by the skew of an electrical angle of 20 degrees.

However, in order to reduce the torque ripple, the fifth and seventh harmonics of the induced voltage must be reduced.

Since the induced voltage usually contains more amount of the fifth harmonic than that of the seventh harmonic, it is effective for reducing the torque ripple to provide the skew at an angle where the fifth harmonic can be fully eliminated. However, the fifth harmonic can not be reduced even if the skew is provided at an electrical angle of 20 degrees, as described above. Therefore, in the case where this electric motor is driven by conducting a sinusoidal electric current, the torque ripple does not become small. There was the problem that even if the auxiliary grooves are formed or the skew angle is provided, it was difficult to reduce the cogging torque and the torque ripple.

SUMMARY OF THE INVENTION

This invention has been achieved to solve the above-mentioned problem, and it is an object of the invention to provide a permanent magnet motor of high performance in which the cogging torque is reduced and the torque ripple is also reduced.

According to a first aspect of the invention, there is provided a permanent magnet motor having a rotor with a plurality of permanent magnets disposed at a predetermined interval in a peripheral direction, and a stator with a plurality of magnetic pole pieces arranged at a predetermined spacing in the peripheral direction, the magnetic pole pieces of the stator being opposed to the permanent magnets of the rotor, wherein the auxiliary grooves are provided on a face of each magnetic pole piece of the stator that is opposed to the permanent magnets of the rotor, and a skew having an electric angle of 72° is provided relatively between the rotor and the stator.

According to a second aspect of the invention, there is provided the permanent magnet motor, wherein a skew having an electric angle of 72° is provided relatively between the rotor and the stator, where the number of poles is equal to 2N, and the number of slots is equal to 3N (N is an integer greater than or equal to 1).

According to a third aspect of the invention, there is provided the permanent magnet motor, wherein a skew having an electric angle of 72° is provided relatively between the rotor and the stator, where the number of poles is equal to N, and the number of slots is equal to 3N (N is an integer greater than or equal to 2).

According to a fourth aspect of the invention, there is provided the permanent magnet motor according to claim 1, wherein a skew having an electric angle of 72° is provided relatively between the rotor and the stator, where the number of poles is equal to 4N, and the number of slots is equal to 3N (N is an even number greater than or equal to 1).

According to a fifth aspect of the invention, there is provided the permanent magnet motor, wherein a skew is disposed on either one of the rotor and the stator.

According to a sixth aspect of the invention, there is provided the permanent magnet motor, wherein a skew is disposed on both the rotor and the stator.

According to a seventh aspect of the invention, there is provided the permanent magnet motor, wherein four auxiliary grooves are provided for every magnetic pole piece.

According to an eighth aspect of the invention, there is provided the permanent magnet motor, wherein the windings of the stator are concentrated.

According to a ninth aspect of the invention, there is provided the permanent magnet motor, wherein the permanent magnet of the rotor is magnetized in a radial direction.

DETAILED DESCRIPTION OF THE PRESENT INVENTION

The present invention will be described with reference to the accompanying drawings.

A permanent magnet motor is provided in which the auxiliary grooves are provided in each magnetic pole piece of a stator to shorten the period of cogging torque, and a skew of an electrical angle of 72° is provided relatively between the stator and a rotor, whereby the low cogging torque and the low torque ripple are effected. This principle will be described below.

Here, away of reducing the harmonics of the induced voltage with the skew, or how the cogging torque changes depending on the number of poles, the number of slots, and the number of auxiliary grooves will be described below.

First, when the skew angle is θ° (electrical angle), the skew factor fs for the q-th harmonic of the induced voltage can be represented as in the following expression 1.

$$fs=(2\sin q\pi\theta/360)/(q2\pi\theta/360) \quad (1)$$

From this expression, when the skew is disposed to eliminate the harmonics of the induced voltage, the q-th harmonic of the non-load induced voltage can be eliminated completely if θ is selected such that θ is equal to 360/q°. That is, to eliminate the fifth harmonic, it is necessary to make a skew angle of θ=360/5=72°, and it is clear that this skew is effective to reduce the torque ripple.

On the other hand, the skew angle for reducing the cogging torque must be a period of cogging torque or an integral multiple of the period. For example, to reduce the cogging torque having a period of an electrical angle of 60°, a skew angle of an electrical angle of 60° or 120° can be conceived, and because the skew angle for reducing the torque ripple is an electrical angle of 72°, as described above, it can be found that the period of cogging torque is necessary to be a factor of 72°.

Next, how the period of cogging torque changes depending on the number of poles, the number of slots and the number of auxiliary grooves will be described below.

In the case where no auxiliary groove is provided in the magnetic pole piece of the stator, the cogging torque is a ripple torque with a least common multiple of the number of poles and the number of slots per rotation of the rotor, in which the value of ripple torque is smaller with the greater number of ripples. Accordingly, there is a way of increasing the number of ripples in such a manner that the auxiliary grooves are provided in the magnetic pole piece of the stator to increase the number of slots virtually and shorten the period, as described above.

For example, in the case of an eight-pole and twelve-slot electric motor, the number of auxiliary grooves per magnetic pole piece of stator and the period of cogging torque will be listed in the following table.

TABLE 1

| Number of auxiliary grooves | Number of poles: Number of slots | Number of cogging torque ripples | Period (electrical angle) |
| --- | --- | --- | --- |
| 0 | 8:12 | 24 | 60 degrees |
| 1 | 8:24 | 24 | 60 degrees |
| 2 | 8:36 | 72 | 20 degrees |
| 3 | 8:48 | 48 | 30 degrees |
| 4 | 8:60 | 120 | 12 degrees |
| 5 | 8:72 | 72 | 20 degrees |

In Table 1, the number of auxiliary grooves represents the number of auxiliary grooves provided for one magnetic pole piece of stator, the number of slots represents the virtual number of slots including the auxiliary grooves, the number of cogging torque ripples represents the number of cogging torque ripples per rotation of rotor, and the period represents the period (electrical angle) of cogging torque.

From this Table 1, the skew angle for reducing the cogging torque can be found. For example, in the case where two auxiliary grooves are provided, the period of cogging torque is 20 degrees in electrical angle, whereby the skew amounting to an integral multiple of 20 degrees may be disposed to reduce the cogging torque.

However, in order to reduce the torque ripple, it was effective to dispose the skew with an electrical angle of 72 degrees as described above, but because 20 is not divisor of 72, the cogging torque can not be reduced for the skew with an electrical angle of 72 degrees. On the other hand, when four auxiliary grooves are provided, the period of cogging torque is equal to an electrical angle of 12 degrees. Hence, when the skew with an electrical angle of 72 degrees is disposed to reduce the torque ripple, the torque ripple and the cogging torque can be reduced at the same time, because 12 is a divisor of 72 and the skew is disposed by an integral multiple (6) of the period of cogging torque.

The electrical angle of the skew may be deviated from the angle of 72 degrees by about −1 deg. to 1 deg. In the above-mentioned description, disposing the skew with an electrical angle of 72 degrees is described. Hereinafter, it will be described that the torque ripple and the cogging torque are sufficiently reduced even if the skew angle is deviated by about −1 deg. to 1 deg. due to the effect of the manufacturing variation, and so on.

As described above, the fifth harmonic that is the main factor for generating the torque ripple is completely eliminated by applying the skew only with an electrical angle 72 degrees. Also, according to the expression (1), even if the skew angle is deviated from the angle of 72 degrees by an electrical angle of about 1 degree, the skew factors of the fifth harmonic of the induced voltage are 0.0141 in case of an electrical angle of 71 degrees and −0.0137 in case of an electrical angle of 73 degrees. These results mean that the fifth harmonic of the induced voltage can be reduced significantly and the torque ripple can also be reduced adequately.

As mentioned before, when four auxiliary grooves are provided at each magnetic pole piece of the stator, the period of the cogging torque is equal to an electrical angle of 12 degrees, and when the skew with an electrical angle of 72 degrees is disposed, the cogging torque can be reduced by the skew with an electrical angle of 72 degrees that is integral multiples of (six times as large as) the electrical angle of 12 degrees. The effect of reducing the cogging torque, in case that the skew angle is deviated from the electrical angle of 72 degrees by about −1 deg. to 1 deg., can be estimated using the skew factor as well as that of the induced voltage. The skew factor corresponding to the cogging torque having the electrical angle period of 12 degrees is equivalent to a case that q=(360 degrees)/12=30 degrees in the expression (1). The skew factor in case of the skew angle θ of 71 degrees is −0.0139, and the skew factor in case of the skew angle of 73 degrees is 0.0135. The results apparently show that the cogging torque can significantly be reduced in both cases.

Embodiments of the present invention will be described below with reference to the drawings.

First Embodiment

Figure 1:
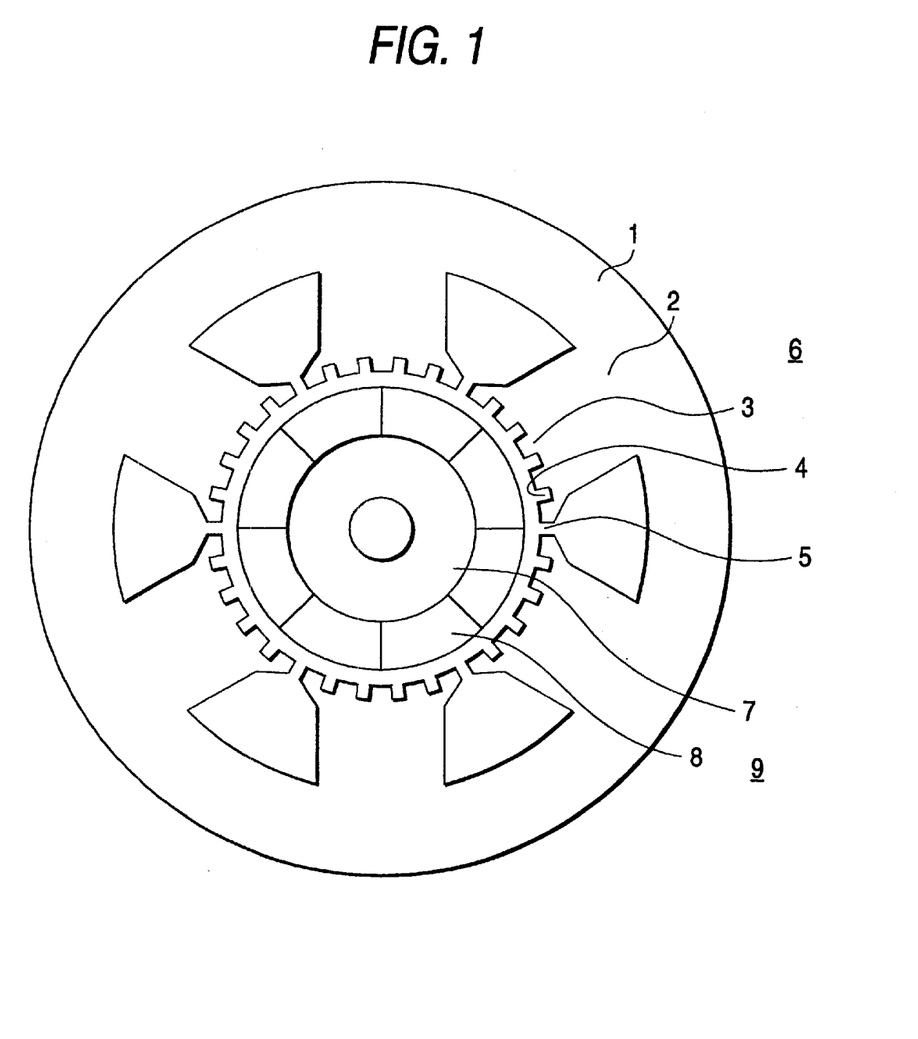
FIG. 1 is a view showing a relation (eight poles, six slots) between a stator and a rotor of a permanent magnet motor according to a first embodiment of the present invention.
Figure 2:
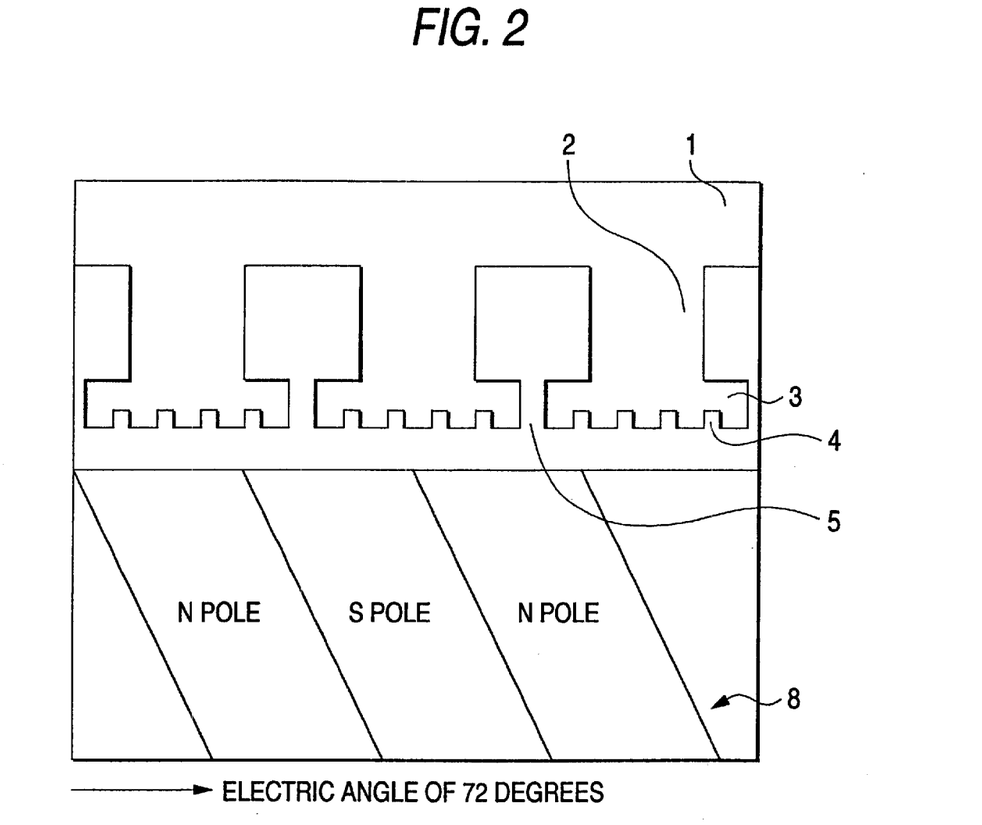
FIG. 2 is a view showing the concept in the case where a skew with an electric angle of 72 degrees is disposed in the rotor of the permanent magnet motor as shown in FIG. 1.
Figure 3:
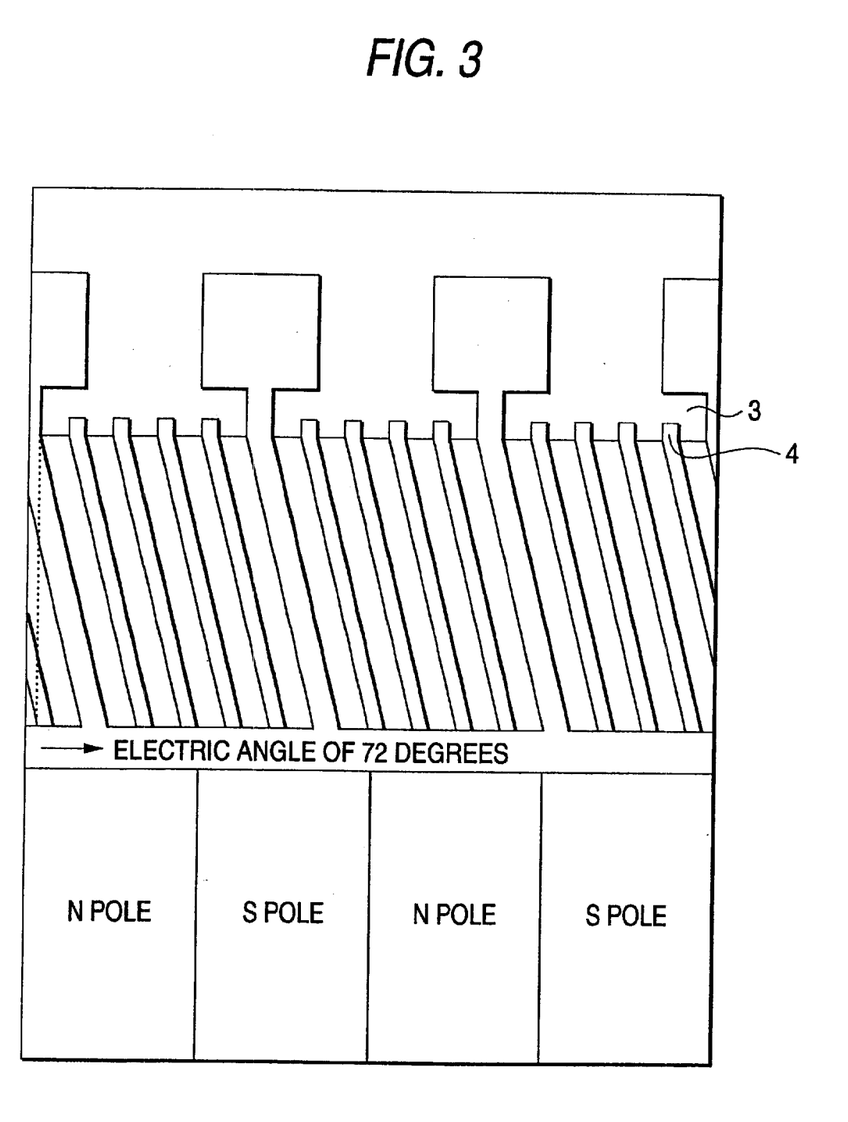
FIG. 3 is a view showing the concept in the case where a skew with an electric angle of 72 degrees is disposed in the stator of the permanent magnet motor as shown in FIG. 1.
Figure 4:
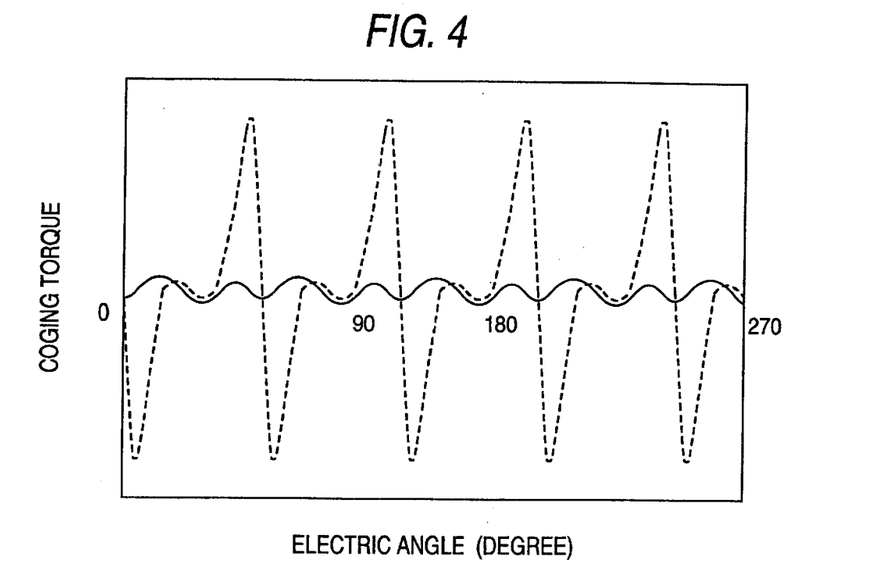
FIG. 4 is a waveform chart showing a cogging torque waveform of the permanent magnet motor in the first embodiment as compared with the conventional one.
Figure 5:
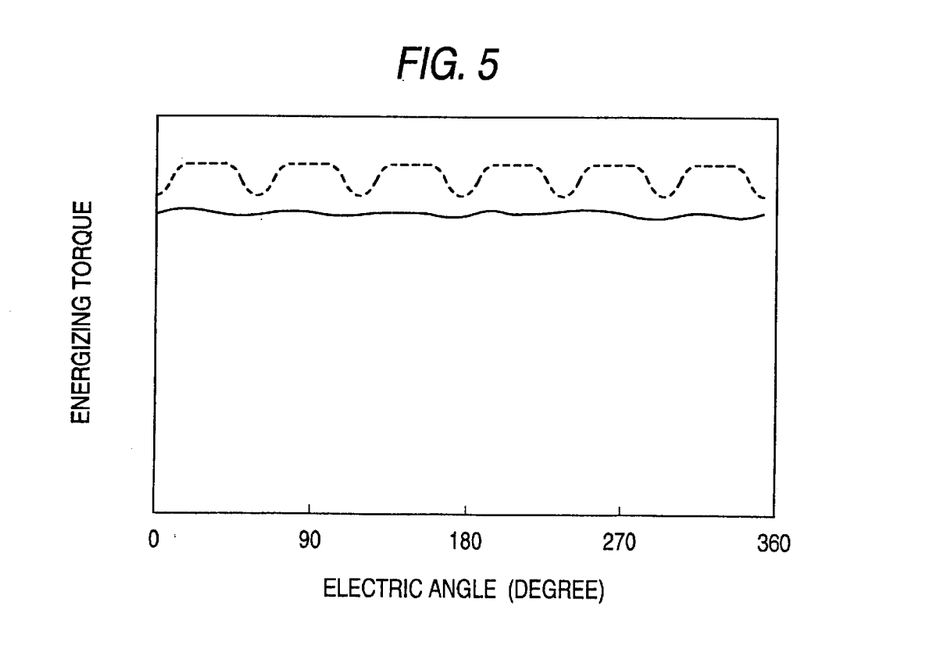
FIG. 5 is a waveform chart showing an energizing torque waveform of the permanent magnet motor in the first embodiment as compared with the conventional one.

FIG. 1 shows a relation between a stator and a rotor in a permanent magnet motor (eight poles, six slots) according to a first embodiment of the invention. FIG. 2 is a view showing the concept in the case where a skew with an electric angle of 72 degrees is disposed in the rotor of the permanent magnet motor as shown in FIG. 1. FIG. 3 is a view showing the concept in the case where a skew with an electric angle of 72 degrees is disposed in the stator of the permanent magnet motor as shown in FIG. 1. FIG. 4 is a waveform chart showing the cogging torque waveform of the permanent magnet motor of the first embodiment, as compared with the conventional one. FIG. 5 is a waveform chart showing the energizing torque waveform of the permanent magnet motor of the first embodiment, as compared with the conventional one.

In FIGS. 1 and 2, reference numeral 1 denotes an annular yoke member. Reference numeral 2 denotes six magnetic pole teeth members protruded at a predetermined spacing on the inner circumferential side of the yoke member 1. Reference numeral 3 denotes magnetic pole pieces formed at the top end of each magnetic pole teeth member 2. Reference numeral 4 denotes four auxiliary grooves formed on an inner peripheral face of each magnetic pole piece 3. Reference numeral 5 denotes a slot formed between magnetic pole pieces 3, in which six slots are provided, and each slot has winding (not shown) arranged inside, as shown in FIG. 1. A stator 6 is comprised of the annular yoke member 1, the magnetic pole teeth members 2, magnetic pole pieces 3, auxiliary grooves 4, and slots 5. Eight permanent magnets 8 are attached around the surface of a rotation axis 7, each permanent magnet extended an axial direction. As shown in FIG. 2, the skew with an electric angle of 72 degrees is disposed. A rotor 9 comprises the rotation axis 7 and the permanent magnets 8.

The permanent magnet motor in the first embodiment includes the stator 6 and the rotor 9, which are constituted in the above way. Since four auxiliary grooves 4 are provided for each magnetic pole piece 3, there is substantially the same effect that thirty slots 5 are virtually provided. The cogging torque has one hundred twenty ripples per revolution of the rotor 9, and the period of cogging torque is an electric angle of 12 degrees. Since each permanent magnet 8 of the rotor 9 is skewed with an electric angle of 72 degrees, it follows that the skew is disposed by six times the period of cogging torque. Therefore, the cogging torque can be reduced significantly, and the fifth harmonic of the induced voltage can be completely eliminated, as shown by the solid line in FIG. 4, in contrast to the conventional one as indicated by the broken line. Consequently, the torque ripple can be also reduced as indicated by the solid line in FIG. 5, as compared with the conventional one indicated by the broken line.

In the configuration of FIGS. 1 and 2, the permanent magnets 8 of the rotor 9 are skewed to provide the skew with an electric angle of 72 degrees relatively between the stator 6 and the rotor 9. Alternatively, the auxiliary grooves 4 formed on the inner peripheral face of each magnetic pole piece 3 of the stator 6 may be skewed so as to provide the skew with an electric angle of 72 degrees relatively between the stator 6 and the rotor 9, as shown in FIG. 3, and it is needless to say that the similar effect can be attained.

With the above constitution, the permanent magnets 8 are attached on the surface of the rotation axis 7. Alternatively, the permanent magnets 8 may be embedded into the rotation axis 7.

Further, with the above constitution, the permanent magnet motor has eight poles and six slots. This invention is not limited to such constitution, but in its essence, the number of permanent magnets 8 and the number of slots 5 may be determined to satisfy the requirements that the number of poles is equal to 4N and the number of slots is equal to 3N (N is an integer greater than or equal to 1), and it is needless to say that the similar effect can be attained.

Second Embodiment

Figure 6:
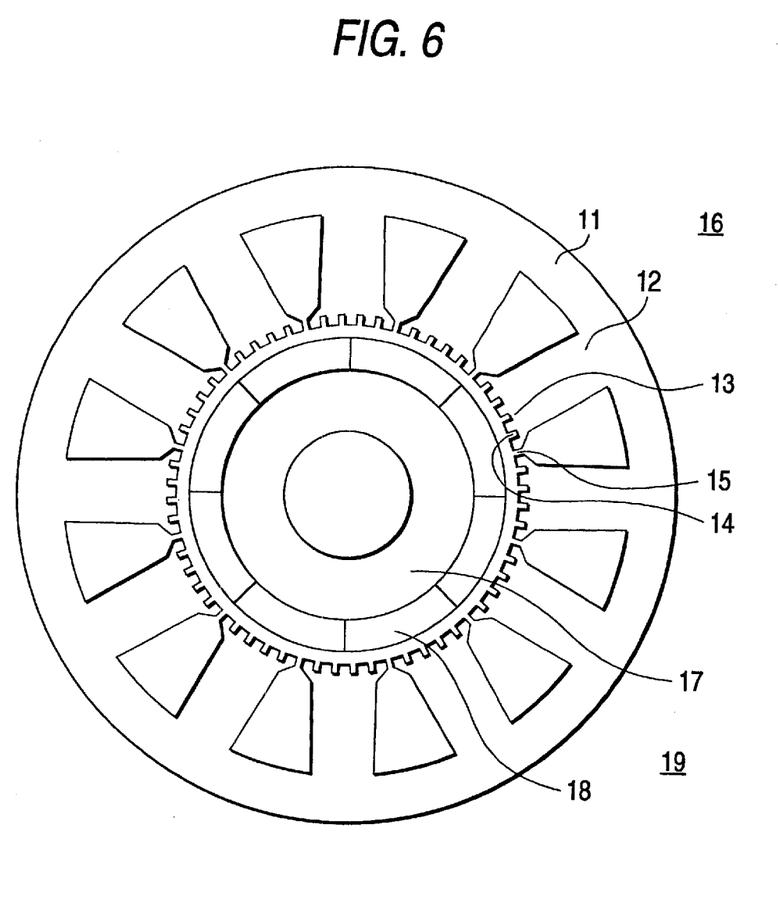
FIG. 6 is a view showing a relation (eight poles, twelve slots) between a stator and a rotor of a permanent magnet motor according to a second embodiment of the invention.
Figure 7:
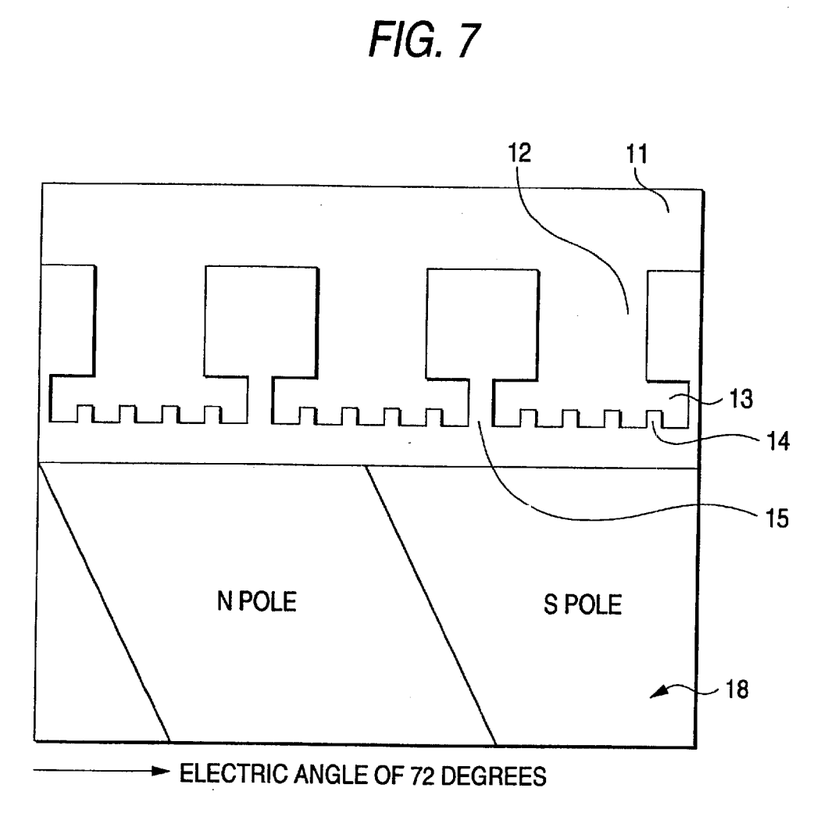
FIG. 7 is a view showing the concept in the case where a skew with an electric angle of 72 degrees is disposed in the rotor of the permanent magnet motor as shown in FIG. 6.
Figure 8:
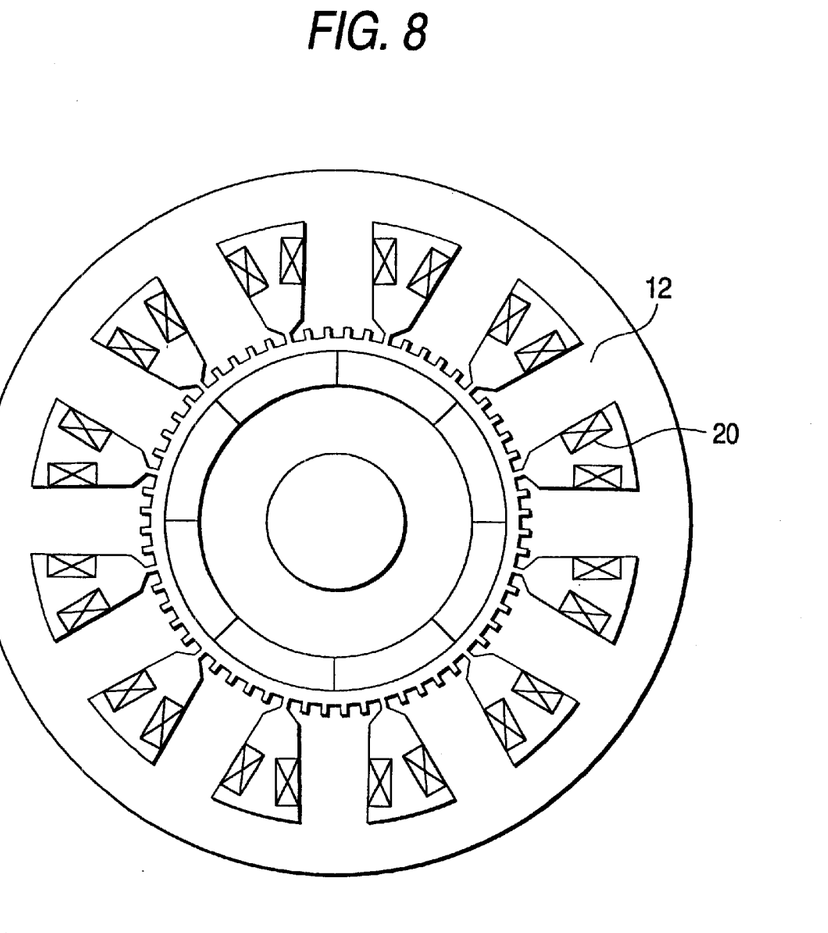
FIG. 8 is a view showing a different configuration from that of the permanent magnet motor of FIG. 6 according to the second embodiment of this invention.

FIG. 6 is a view showing a relation between a stator and a rotor in a permanent magnet motor (eight poles, twelve slots) according to a second embodiment of this invention. FIG. 7 is a view showing the concept in the case where askew with an electric angle of 72 degrees is disposed in the rotor of the permanent magnet motor as shown in FIG. 6. FIG. 8 is a view showing a different configuration of the permanent magnet motor from that of FIG. 6.

In FIGS. 6 and 7, reference numeral 11 denotes an annular yoke member. Reference numeral 12 denotes twelve magnetic pole teeth members protruded at a predetermined interval on the inner circumferential side of the yoke member 11. Reference numeral 13 denotes magnetic pole pieces formed at the top end of each magnetic pole teeth member 12. Reference numeral 14 denotes four auxiliary grooves formed on an inner peripheral face of each magnetic pole piece 13. Reference numeral 15 denotes a slot formed between magnetic pole pieces 13, in which twelve slots are provided, and each slot has winding (not shown) arranged inside, as shown in FIG. 6. A stator 16 is comprised of the annular yoke member 11, the magnetic pole teeth members 12, magnetic pole pieces 13, auxiliary grooves 14, and slots 15. Eight permanent magnets 18 are attached around the surface of a rotation axis 17, each permanent magnet extended in an axial direction. As shown in FIG. 7, the skew with an electric angle of 72 degrees is disposed. A rotor 19 is comprised of the rotation axis 17 and the permanent magnets 18.

The permanent magnet motor in the second embodiment includes the stator 16 and the rotor which are constituted in the above way. Since four auxiliary grooves 14 are provided for each magnetic pole piece 13, there is substantially the same effect that sixty slots 15 are virtually provided. The cogging torque has one hundred twenty ripples per revolution of the rotor 19, and the period of cogging torque is an electric angle of 12 degrees. Since each permanent magnet 18 of the rotor 19 is skewed with an electric angle of 72 degrees, it follows that the skew is disposed by six times the period of cogging torque. Therefore, the cogging torque can be reduced significantly, and the fifth harmonic of the induced voltage can be completely eliminated, as in the first embodiment. Consequently, the torque ripple can be reduced.

In the configuration of FIGS. 6 and 7, the permanent magnets 18 of the rotor 19 are skewed to provide the skew with an electric angle of 72 degrees relatively between the stator 16 and the rotor 19. Alternatively, the auxiliary grooves 14 formed on the inner peripheral face of each magnetic pole piece 13 of the stator 16 may be skewed so as to provide the skew with an electric angle of 72 degrees relatively between the stator 16 and the rotor 19, though not shown, and it is needless to say that the similar effect can be attained.

With the above constitution, the permanent magnets 18 are attached on the surface of the rotation axis 17. Alternatively, the permanent magnets 18 may be embedded into the rotation axis 17.

Further, though not described in detail with the above constitution, a magnetic pole teeth member 12 of the stator 16 may be wound with a coil 20 intensively to facilitate the winding operation of the coil 20, making it possible to reduce the size of the stator by shortening the coil end, as shown in FIG. 8.

In the above constitution, the permanent magnet motor comprises eight poles and twelve slots. This invention is not limited to such constitution, but in its essence, the number of permanent magnets 18 and the number of slots 15 may be determined to satisfy the requirements that the number of poles is equal to 2N and the number of slots is equal to 3N (N is an integer greater than or equal to 1), whereby it is needless to say that the similar effect can be attained.

Third Embodiment

Figure 9:
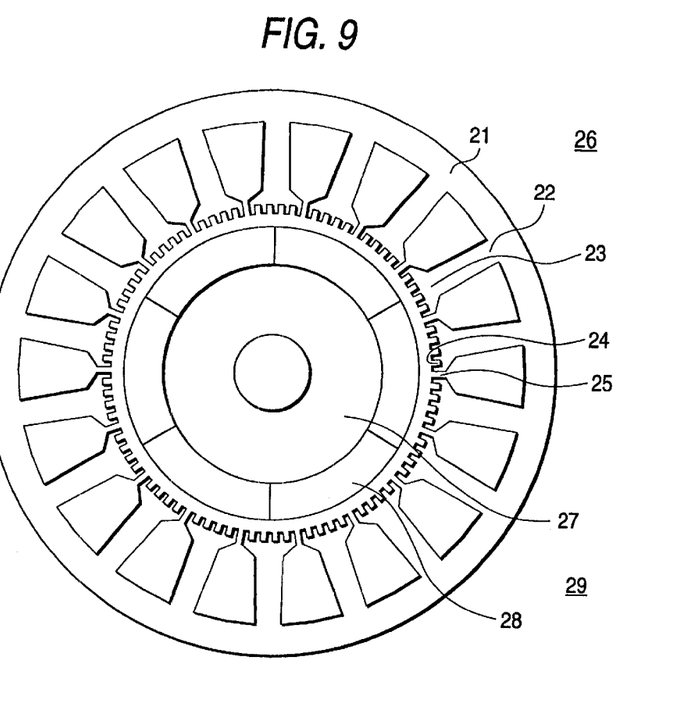
FIG. 9 is a view showing a relation (six poles, eighteen slots) between a stator and a rotor of a permanent magnet motor according to a third embodiment of the invention.
Figure 10:
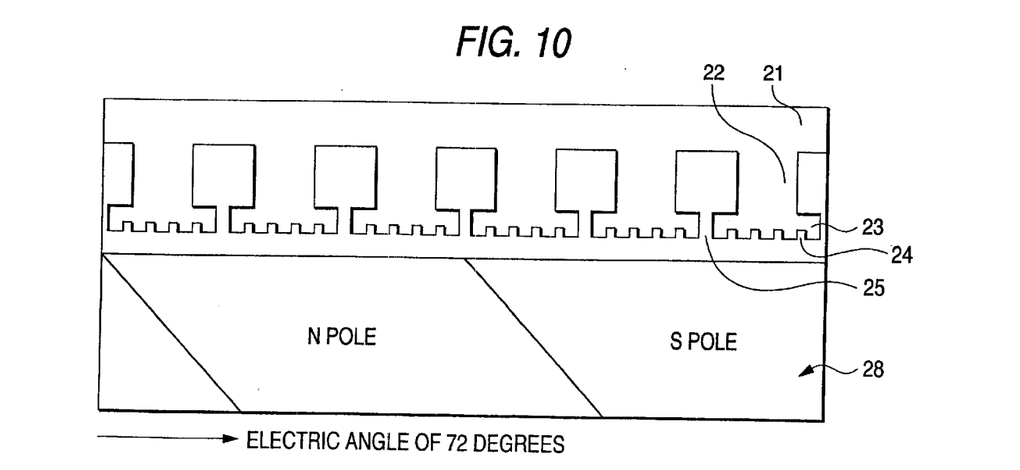
FIG. 10 is a view showing the concept in the case where a skew with an electric angle of 72 degrees is disposed in the rotor of the permanent magnet motor as shown in FIG. 9.

FIG. 9 shows a relation between a stator and a rotor in a permanent magnet motor (six poles, eighteen slots) according to a third embodiment of this invention. FIG. 10 is a view showing the concept in the case where a skew with an electric angle of 72 degrees is disposed in the rotor of the permanent magnet motor as shown in FIG. 9.

In FIGS. 9 and 10, reference numeral 21 denotes an annular yoke member. Reference numeral 22 denotes eighteen magnetic pole teeth members protruded at a predetermined interval on the inner circumferential side of the yoke member 21. Reference numeral 23 denotes magnetic pole pieces formed at the top end of each magnetic pole teeth member 22. Reference numeral 24 denotes four auxiliary grooves formed on an inner peripheral face of each magnetic pole piece 23. Reference numeral 25 denotes a slot formed between magnetic pole pieces 23, in which eighteen slots are provided as shown in FIG. 9. A stator 26 is comprised of the annular yoke member 21, the magnetic pole teeth members 22, magnetic pole pieces 23, auxiliary grooves 24, and slots 25. Six permanent magnets 28 are attached around the surface of a rotation axis 27, each permanent magnet extended in an axial direction. As shown in FIG. 10, the skew with an electric angle of 72 degrees is disposed. A rotor 29 is comprised of the rotation axis 27 and the permanent magnets 28.

The permanent magnet motor in the third embodiment includes the stator 26 and the rotor 29, which are constituted in the above way. Since four auxiliary grooves 24 are provided for each magnetic pole piece 23, there is substantially the same effect that ninety slots 25 are virtually provided. The cogging torque has ninety ripples per revolution of the rotor 29, and the period of cogging torque is an electric angle of 12 degrees. Since each permanent magnet 28 of the rotor 29 is skewed with an electric angle of 72 degrees, the skew is disposed by six times the period of cogging torque. Therefore, the cogging torque can be reduced significantly, and the fifth harmonic of the induced voltage can be completely eliminated. Consequently, the torque ripple can be reduced.

In the configuration of FIGS. 9 and 10, the permanent magnets 28 of the rotor 29 are skewed to provide the skew with an electric angle of 72 degrees relatively between the stator 26 and the rotor 29. Alternatively, the auxiliary grooves 24 formed on the inner peripheral face of each magnetic pole piece 23 of the stator 26 may be skewed so as to provide the skew with an electric angle of 72 degrees relatively between the stator 26 and the rotor 29, though not shown, and it is needless to say that the similar effect can be attained.

With the above constitution, the permanent magnets 28 are attached on the surface of the rotation axis 27. Alternatively, the permanent magnets 28 may be embedded into the rotation axis 27.

Further, with the above constitution, the permanent magnet motor comprises six poles and eighteen slots. This invention is not limited to such constitution, but in its essence, the number of permanent magnets 28 and the number of slots 25 may be determined to satisfy the requirements that the number of poles is equal to N and the number of slots is equal to 3N (N is an even number greater than or equal to 2), whereby it is needless to say that the similar effect can be attained.

Fourth Embodiment

Figure 11:
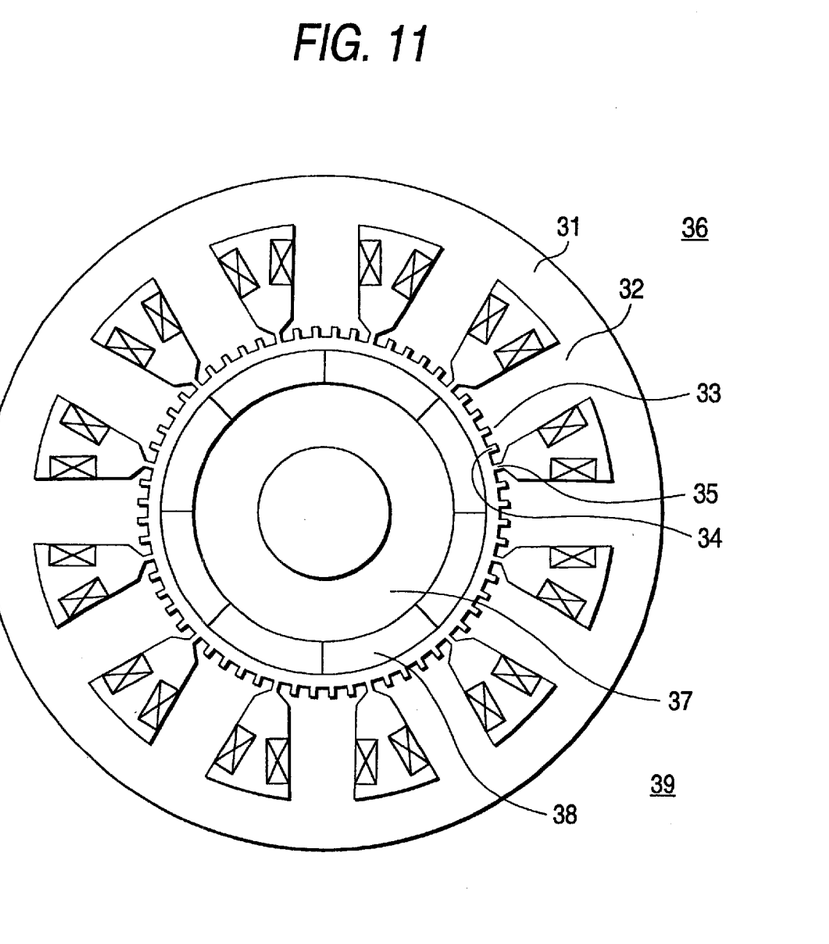
FIG. 11 is a view showing a relation (eight poles, twelve slots) between a stator and a rotor of a permanent magnet motor according to a fourth embodiment of the invention.
Figure 12:
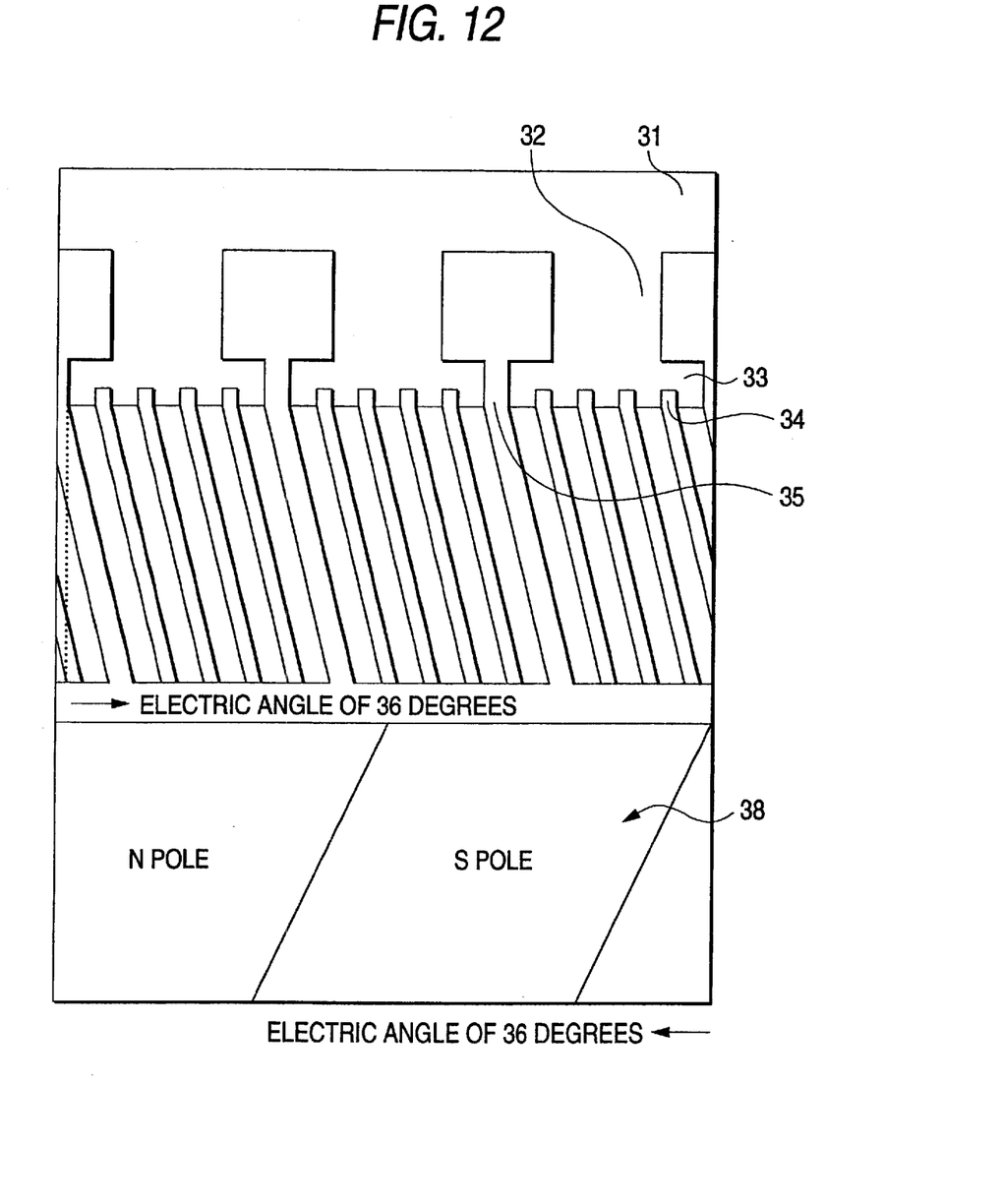
FIG. 12 is a view showing the concept in the case where a skew with an electric angle of 36 degrees is disposed in each of the stator and rotor of the permanent magnet motor as shown in FIG. 11.

FIG. 11 shows a relation between a stator and a rotor in a permanent magnet motor (eight poles, twelve slots) according to a fourth embodiment of this invention. FIG. 12 is a view showing the concept in the case where a skew with an electric angle of 36 degrees is disposed in each of the stator and the rotor of the permanent magnet motor as shown in FIG. 11.

In FIGS. 11 and 12, reference numeral 31 denotes an annular yoke member. Reference numeral 32 denotes twelve magnetic pole teeth members protruded at a predetermined interval on the inner circumferential side of the yoke member 31. Reference numeral 33 denotes magnetic pole pieces formed at the top end of each magnetic pole teeth member 32. Reference numeral 34 denotes four auxiliary grooves formed on an inner peripheral face of each magnetic pole piece 33 and skewed with an electrical angle of 36 degrees in corporation with the magnetic pole teeth members 32 and the magnetic pole pieces 33, as shown in FIG. 12. Reference numeral 35 denotes a slot formed between magnetic pole pieces 33, and skewed with an electrical angle of 36 degrees like the auxiliary grooves 34, in which twelve slots are provided as shown in FIG. 11. A stator 36 is comprised of the annular yoke member 31, the magnetic pole teeth members 32, magnetic pole pieces 33, auxiliary grooves 34, and slots 35. Eight permanent magnets 38 are attached around the surface of a rotation axis 37, each permanent magnet extended in an axial direction. As shown in FIG. 12, the skew with an electric angle of 36 degrees is disposed. A rotor 39 is comprised of the rotation axis 37 and the permanent magnets 38.

The permanent magnet motor in the fourth embodiment includes the stator 36 and the rotor 39, which are constituted in the above way. Since four auxiliary grooves 34 are provided for each magnetic pole piece 33, there is substantially the same effect that sixty slots 35 are virtually provided. The cogging torque has one hundred twenty ripples per revolution of the rotor 39, and the period of cogging torque is an electric angle of 12 degrees. Since the auxiliary grooves 34 and the slots 35 of the stator 36 and the permanent magnets 38 of the rotor 39 are skewed with an electric angle of 36 degrees, the skew is disposed by six times the period of cogging torque. Therefore, the cogging torque can be reduced significantly, and the fifth harmonic of the induced voltage can be completely eliminated. Consequently, the torque ripple can be reduced.

In the configuration of FIGS. 11 and 12, the skew with an electric angle of 36 degrees is disposed in each of the stator 36 and the rotor 39. However, the invention is not limited to such configuration. Alternatively, the total of skew angles for the stator 36 and the rotor 39 may be equivalent to an electrical angle of 72 degrees.

With the above constitution, the permanent magnets 38 are attached on the surface of the rotation axis 37. Alternatively, the permanent magnets 38 may be embedded into the rotation axis 37.

Fifth Embodiment

Figure 13:
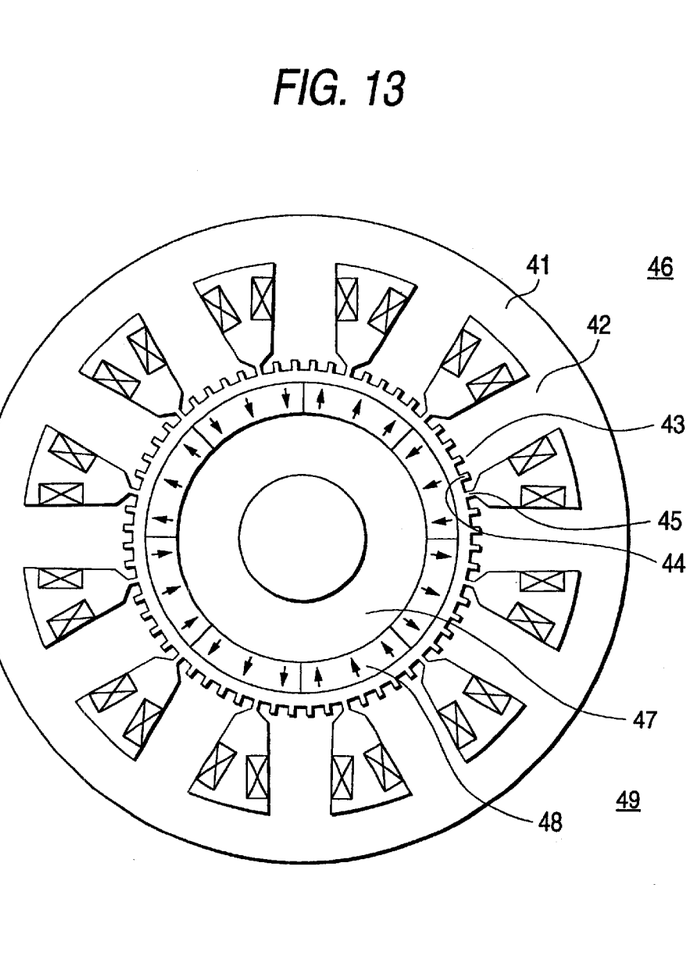
FIG. 13 is a view showing a relation (eight poles, twelve slots) between a stator and a rotor of a permanent magnet motor according to a fifth embodiment of the invention.
Figure 14:
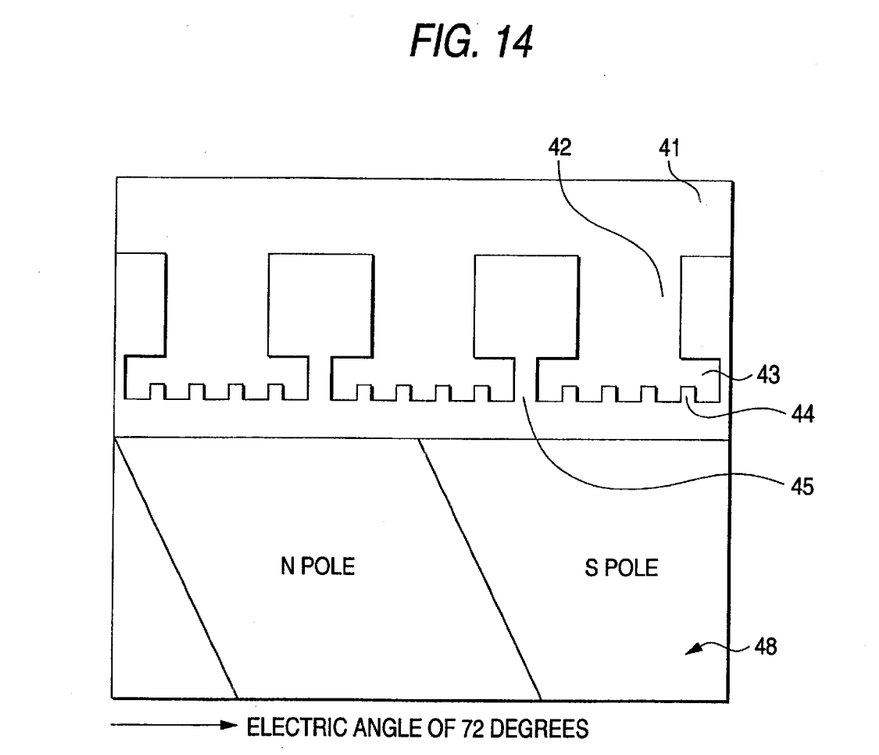
FIG. 14 is a view showing the concept in the case where a skew with an electric angle of 72 degrees is disposed in the rotor of the permanent magnet motor as shown in FIG. 13.

FIG. 13 shows a relation between a stator and a rotor in a permanent magnet motor (eight poles, twelve slots) according to a fifth embodiment of this invention. FIG. 14 is a view showing the concept in the case where a skew with an electric angle of 72 degrees is disposed in the rotor of the permanent magnet motor as shown in FIG. 13.

In FIGS. 13 and 14, reference numeral 41 denotes an annular yoke member. Reference numeral 42 denotes twelve magnetic pole teeth members protruded at a predetermined interval on the inner circumferential side of the yoke member 41. Reference numeral 43 denotes magnetic pole pieces formed at the top end of each magnetic pole teeth member 42. Reference numeral 44 denotes four auxiliary grooves formed on an inner peripheral face of each magnetic pole piece 43. Reference numeral 45 denotes a slot formed between magnetic pole pieces 43, in which twelve slots are provided as shown in FIG. 13. A stator 46 is comprised of the annular yoke member 41, the magnetic pole teeth members 42, magnetic pole pieces 43, auxiliary grooves 44, and slots 45. Eight permanent magnets 38 are attached around the surface of a rotation axis 47, each permanent magnet extended in an axial direction and magnetized in a radial direction. As shown in FIG. 14, the skew with an electric angle of 72 degrees is disposed. A rotor 49 is comprised of the rotation axis 47 and the permanent magnets 48.

The permanent magnet motor in the fifth embodiment includes the stator 46 and the rotor 49, which are constituted in the above way. Since four auxiliary grooves 44 are provided for each magnetic pole piece 43, there is substantially the same effect that sixty slots 45 are virtually provided. The cogging torque has one hundred twenty ripples per revolution of the rotor 49, and the period of cogging torque is an electric angle of 12 degrees. Since each permanent magnet 48 of the rotor 49 is skewed with an electric angle of 72 degrees, the skew is disposed by six times the period of cogging torque. Therefore, the cogging torque can be reduced significantly, and the fifth harmonic of the induced voltage can be completely eliminated. Consequently, the torque ripple can be reduced. Moreover, since the permanent magnet motor using the permanent magnets 48 magnetized in the radial direction has a magnetomotive force containing many harmonics, and has large cogging torque or torque ripple, the significant reduction effect can be expected.

With the above constitution, the permanent magnets 48 are attached on the surface of the rotation axis 47. Alternatively, the permanent magnets 48 may be embedded into the rotation axis 47.

In the above-described embodiments, four auxiliary grooves are provided for each magnetic pole piece, but may be appropriate for easy processing in consideration of the size of magnetic pole pieces.

According to the present invention, there is provided a permanent magnet motor having a rotor with a plurality of permanent magnets disposed at a predetermined interval in a peripheral direction, and a stator with a plurality of magnetic pole pieces arranged at a predetermined spacing in the peripheral direction, the magnetic pole pieces being opposed to the permanent magnets, wherein the auxiliary grooves are provided on a face of each magnetic pole piece of the stator that is opposed to the permanent magnets of the rotor, and a skew having an electric angle of 72° is provided relatively between the rotor and the stator. Hence, the cogging torque and the torque ripple are reduced at the same time. Thus, the permanent magnet motor of high performance can be provided.

According to the invention, there is provided the permanent magnet motor, wherein a skew having an electric angle of 72° is provided relatively between the rotor and the stator, where the number of poles is equal to 2N, and the number of slots is equal to 3N (N is an integer greater than or equal to 1). Hence, the cogging torque and the torque ripple are reduced at the same time. Thus, the permanent magnet motor of high performance can be provided.

According to the invention, there is provided the permanent magnet motor, wherein a skew having an electric angle of 72° is provided relatively between the rotor and the stator, where the number of poles is equal to N, and the number of slots is equal to 3N (N is an even number greater than or equal to 2). Hence, the cogging torque and the torque ripple are reduced at the same time, and it is possible to provide the permanent magnet motor of high performance.

According to the invention, there is provided the permanent magnet motor, wherein a skew having an electric angle of 72° is provided relatively between the rotor and the stator, where the number of poles is equal to 4N, and the number of slots is equal to 3N (N is an integer greater than or equal to 1). Hence, the cogging torque and the torque ripple are reduced at the same time, and it is possible to provide the permanent magnet motor of high performance.

According to the invention, there is provided the permanent magnet motor, wherein a skew is disposed on either one of the rotor and the stator. Hence, the cogging torque and the torque ripple are reduced at the same time, and it is possible to provide the permanent magnet motor of high performance.

According to the invention, there is provided the permanent magnet motor, wherein a skew is disposed on both the rotor and the stator. Hence, the cogging torque and the torque ripple are reduced at the same time, and it is possible to provide the permanent magnet motor of high performance.

According to the invention, there is provided the permanent magnet motor, wherein four auxiliary grooves are provided for every magnetic pole piece. Hence, the cogging torque and the torque ripple are reduced at the same time, and it is possible to provide the permanent magnet motor in which the auxiliary grooves can be easily fabricated.

According to the invention, there is provided the permanent magnet motor, wherein the windings of the stator are concentrated. As a result, the cogging torque and the torque ripple are reduced at the same time, and it is possible to provide the permanent magnet motor which can be reduced in size and in which the winding operation is facilitated.

According to the invention, there is provided the permanent magnet motor, wherein the permanent magnet of the rotor is magnetized in a radial direction. As a result, it is possible to provide the permanent magnet motor in which the cogging torque and the torque ripple are reduced at the same time.

In the above-described first to fifth embodiments, an inner rotor type electric motor is exemplified. This invention is not limited to such inner rotor electric motor, but may be applied to an outer rotor type electric motor, in which it is needless to say that the same effect as above can be exhibited.

Further, besides the inner rotor type and the outer rotor type, this invention is applicable to a linear type electric motor.

What is claimed is:

1. A permanent magnet motor comprising:
    a rotor having M permanent magnets disposed at an interval in a peripheral direction of the rotor;
    a stator having P magnetic pole pieces arranged at a spacing in the peripheral direction, the magnetic pole pieces being opposed to the M permanent magnets;
    n auxiliary groves in a face of each of the magnetic pole pieces of the stator opposed to the permanent magnets of the rotor, wherein
    M, P, and n are integers,
    the rotor and stator are skewed relative to each other by an electrical angle of 72°, and
    cogging torque of the motor has a period, measured as an electrical angle, that is a factor of 72°, whereby both cogging torque and fifth harmonic torque ripple are minimized.

2. The permanent magnet motor according to claim 1, wherein the skew is provided on one of the rotor and the stator.

3. The permanent magnet motor according to claim 1, wherein the skew is provided on both the rotor and the stator.

4. The permanent magnet motor according to claim 1, including four auxiliary grooves for every magnetic pole piece.

5. The permanent magnet motor according to claim 1, wherein the windings of the stator are concentrated.

6. The permanent magnet motor according to claim 1, wherein the permanent magnets of the rotor are magnetized in a radial direction.

* * * * *

UNITED STATES PATENT AND TRADEMARK OFFICE
CERTIFICATE OF CORRECTION

PATENT NO. : 6,462,452 B2
DATED : October 8, 2002
INVENTOR(S) : Nakano et al.

It is certified that error appears in the above-identified patent and that said Letters Patent is hereby corrected as shown below:

<u>Column 11, lines 13-22 through Column 12, lines 1-7,</u>
Replace claim 1 with:

1. A permanent magnet motor comprising:
a rotor having M permanent magnets disposed at an interval in a peripheral direction of the rotor;
a stator having P magnetic pole pieces arranged at a spacing in the peripheral direction, the magnetic pole pieces being opposed to the M permanent magnets;
n auxiliary grooves in a face of each of the magnetic pole pieces of the stator opposed to the permanent magnets of the rotor, wherein
a skew having an electrical angle of 72° is provided relatively between the rotor and the stator,
M, P, and n are integers,
cogging torque ripples per rotation of the rotor equal the smallest integer of which both M and (n + 1) • P are factors when no skew is provided relatively between the rotor and the stator,
an electrical angle corresponding to a period of the cogging torque ripples is 180 • M divided by cogging torque ripples per rotation of the rotor, which equals the smallest integer of which both M and (n + 1) • P are factors, and
M, P, and n are in a relationship so that the period of the cogging torque of the motor, as an electrical angle, is a factor of 72°.

Signed and Sealed this

Twenty-sixth Day of August, 2003

JAMES E. ROGAN
*Director of the United States Patent and Trademark Office*